United States Patent [19]

Sugiyama et al.

[11] Patent Number: 5,684,536
[45] Date of Patent: Nov. 4, 1997

[54] ORTHOGONAL TRANSFORM CODING APPARATUS AND DECODING APPARATUS

[75] Inventors: Kenji Sugiyama; Hiroya Nakamura, both of Yokosuka, Japan

[73] Assignee: Victor Company of Japan, Ltd., Yokohama, Japan

[21] Appl. No.: 569,428

[22] Filed: Dec. 8, 1995

Related U.S. Application Data

[62] Division of Ser. No. 397,752, Mar. 2, 1995, Pat. No. 5,502,491, which is a division of Ser. No. 113,676, Aug. 31, 1993, Pat. No. 5,424,778.

[30] Foreign Application Priority Data

Aug. 31, 1992 [JP] Japan ................... 4-255870
Mar. 26, 1993 [JP] Japan ................... 5-92285

[51] Int. Cl.[6] .................................... H04N 7/30
[52] U.S. Cl. ............................ 348/403; 382/250
[58] Field of Search .......................... 348/27, 384, 390, 348/400–405, 419, 420, 407, 409–413, 415, 416, 699; 382/232, 236, 238, 248–251; H04N 7/133

[56] References Cited

U.S. PATENT DOCUMENTS

| | | | |
|---|---|---|---|
| 4,691,329 | 9/1987 | Juri et al. | 348/403 |
| 4,999,705 | 3/1991 | Puri | 348/412 |
| 5,045,938 | 9/1991 | Sugiyama | 348/408 |
| 5,196,930 | 3/1993 | Kadono et al. | 348/403 |
| 5,196,933 | 3/1993 | Henot | 348/420 |
| 5,351,086 | 9/1994 | Park | 348/402 |

*Primary Examiner*—Richard Lee
*Attorney, Agent, or Firm*—Jacobson, Price, Holman & Stern, PLLC

[57] ABSTRACT

Image signals are orthogonal-transformed (DCTed) in mutually different dimensions (DMs) to obtain transform coefficients (TC) for each DM, which are then compared mutually to select TC of one DM based on the comparison. Or else, such TC of one DM are selected based on the image signals in a specific DM and the selected TC are quantized and variable-length coded to output coded signals. In another way, prediction error (PE) signals obtained by predictive coding (PC) are DCTed in mutually different DMs to obtain TC for each DM; the TC of one DM are selected based on the PE signals in a specific DM, and then quantized and coded. Or else, the TC obtained for each DM are quantized and then compared mutually. The quantized signals of one DM are selected based on the comparison and then coded. Or else, the TC obtained for each DM are quantized and coded, and coded signals of one DM are selected based on the comparison. The coded signals are transmitted together with mode information (MI) indicating which DM the selected TC are transformed in. The coded signals are decoded, and then inversely quantized (IQed). The IQed signals are inversely DCTed in the DM indicated by the MI.

5 Claims, 10 Drawing Sheets

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

| 0 | 8 | 16 | 24 | 32 | 40 | 48 | 56 |
|---|---|---|---|---|---|---|---|
| 1 | 9 | 17 | 25 | 33 | 41 | 49 | 57 |
| 2 | 10 | 18 | 26 | 34 | 42 | 50 | 58 |
| 3 | 11 | 19 | 27 | 35 | 43 | 51 | 59 |
| 4 | 12 | 20 | 28 | 36 | 44 | 52 | 60 |
| 5 | 13 | 21 | 29 | 37 | 45 | 53 | 61 |
| 6 | 14 | 22 | 30 | 38 | 46 | 54 | 62 |
| 7 | 15 | 23 | 31 | 39 | 47 | 55 | 63 |

ORTHOGONAL TRANSFORM CODING APPARATUS AND DECODING APPARATUS

This is a DIVISIONAL of application Ser. No. 08/397,752 filed Mar. 2, 1995, now U.S. Pat. No. 5,502,491 which, in turn, is a DIVISIONAL of application Ser. No. 08/113,676 filed Aug. 31, 1993, now U.S. Pat. No. 5,424,778.

BACKGROUND OF THE INVENTION

1. Field of the Invention

The present invention relates to a coding apparatus and a decoding apparatus for executing orthogonal transform (DCT (Discrete Cosine Transform), in particular), which can code signals and decode the coded signals by a high efficient coding and decoding method on the basis of a small coding quantity, in a digital signal processing (e.g., recording, transmitting, displaying, etc.) system.

2. Description of the Prior Art

In the high efficient coding technique using the orthogonal transform such as DCT, the quantity of data can be reduced on the basis of effective utilization of interframe correlation. Therefore, this coding technique is widely adopted as the standard technique. In this coding technique, the orthogonal transform is executed, in general, in two dimensions of vertical and horizontal directions of a block of image signals, for instance. This is because in the case of the one dimensional orthogonal transform, only one of the vertical and horizontal interframe correlations can be used; on the other hand, in the case of the two dimensional orthogonal transform, both the vertical and horizontal interframe correlations can be used.

Further, it is effective to increase the size of transform block from the correlation standpoint, because the interframe correlation can be utilized more efficiently with increasing size of the transform block. In practice, however, there exists no substantial difference when the number of pixels is 8×8 or more. On the other hand, since the quantization error extends over the block, it is preferable to decrease the size of the block from the visual standpoint. In addition, the processing quantity decreases with decreasing size of the block.

In summary, it is most general to transform image signals of the block of 8×8 pixels (8 degrees in both vertical and horizontal directions). In addition, in the case of the moving image coding, it is general to execute interframe predictive coding in the time direction and to adopt the spatial orthogonal transform for the prediction error.

FIG. 1 shows a prior art coding apparatus. In the drawing, the apparatus comprises an image input 1, a horizontal DCT (discrete cosine transformer) 2, a vertical DCT 3, a quantizer 5, a variable length coder 6, and a coded signal output 7. The horizontal DCT 2 transforms inputted image signals in accordance with 8-degree discrete cosine transform in the horizontal direction for each two-dimensional block of 8×8 pixels. Further, the vertical DCT 3 further transforms the horizontally DCTed (discrete cosine transformed) signals in accordance with 8-degree discrete cosine transform in the vertical direction. The quantizer 5 quantizes the DCTed signals to such a quantization step width that the quantization error is not distinguishable visually. Here, the coefficients of almost all quantized signals are zero. The variable length coder 6 transforms the sequence of signals arranged in the two-dimensional block status into the sequence of signals arranged in the one-dimensional status (referred to as "zigzag scanning sequence") as listed in FIG. 2A. The run lengths of the zero coefficients and the values of the non-zero coefficients are coded in accordance with a VLC (variable length coding) such as Huffuman code. The output of the variable length coder 6 is outputted as compressed data to a decoding apparatus (described below) through the code output 7.

FIG. 3 shows a prior art decoding apparatus corresponding to the coding apparatus shown in FIG. 1. The decoding apparatus comprises a coded signal input 21, a variable length decoder 22, an inverse quantizer 23, a vertical inverse DCT 24, a horizontal inverse DCT 25, and an image output 26. The variable length decoder 22 decodes the compressed data of the variable length code to the fixed length codes. The inverse quantizer 23 inversely quantizes the fixed length codes to values representative of the quantization of the coded signals. The vertical inverse DCT 24 inversely transforms the inputted representative values in the vertical direction. The horizontal inverse DCT 25 further inversely transforms the inputted representative values in the horizontal direction. The obtained reproduced image signals are outputted through an image signal output 26.

In the above-mentioned two-dimensional orthogonal transform coding apparatus, the transform efficiency is relatively high in the image portion in which the interframe correlation is relatively high. However, the prior art apparatus is not necessarily suitable for the image portion in which the interframe correlation is relatively low, for instance at the image edge portions. The above-mentioned tendency is prominent in the interframe prediction error signals, in particular. In other words, since the interframe correlation of the error signals is low, the two-dimensional orthogonal transform is not an appropriate coding method. Therefore, there exist some portions at which the one-dimensional transform such as only the horizontal or vertical transform is higher in efficiency than the two-dimensional transform.

Further, in the two-dimensional transform, the quantization error extends over the two-dimensional block, so that the noise components are prominent in the vicinity of the image edges. In other words, the one-dimensional transform using a small transform block is preferable from the visual standpoint, as far as the equivalent coding error is allowed. Further, although the other coding technique such as DPCM (Differential Pulse Code Modulation) is preferable because the noise components are not prominent from the visual standpoint, the interframe correlation cannot be utilized effectively in the other coding technique, so that the basic efficiency is insufficient.

SUMMARY OF THE INVENTION

The object of the present invention is to provide an orthogonal transform coding apparatus high in coding efficiency and low in noise components, and an orthogonal transform decoding apparatus corresponding to the coding apparatus.

To achieve the above-mentioned object, the present invention provides an image signal coding apparatus comprising: means for orthogonal-transforming image signals to be coded in different dimensions to obtain transform coefficients for each mutually different transform dimension; means for detecting a status of the image signals in a predetermined dimension; means for selecting the transform coefficients of one of the transform dimensions on the basis of the detected result; means for quantizing the selected transform coefficients; and means for coding the quantized signals to output the coded signals.

Further the present invention provides an image signal coding apparatus comprising: means for forming prediction error signals by subtracting prediction signals from image signals to be coded, respectively; means for orthogonal-transforming the prediction error signals in mutually different dimensions to obtain transform coefficients for each different transform dimension; means for detecting a status of the prediction error signals in a predetermined dimension; means for selecting the transform coefficients of one of the dimensions on the basis of the detected result; means for quantizing the selected transform coefficients; and means for coding the quantized signals to output the coded signals.

Further, the present invention provides an image signal coding apparatus comprising: means for orthogonal-transforming image signals in mutually different dimensions to obtain transform coefficients for each different transform dimension; means for quantizing the transformed coefficients for each dimension; means for comparing the quantized signals for each dimension; means for selecting the quantized signals of one of the transform dimensions on the basis of the compared result; and means for coding the selected quantized signals to output the coded signals.

Further, the present invention provides an image coding apparatus comprising: means for orthogonal-transforming image signals to be coded in mutually different dimensions to obtain transform coefficients for each different transform dimension; means for quantizing the transformed coefficients for each dimension; means for coding the quantized signals for each dimension; means for comparing a coded quantity of the coded signals for each dimension; and means for selecting the coded signals of one of the transform dimensions on the basis of the compared result.

Further, the present invention provides an image signal decoding apparatus for decoding coded image signals obtained by orthogonal-transforming image signals in mutually different dimensions, selecting transformed coefficients of one dimension from the transformed coefficients obtained in the different dimensions according to a status of the image signals in a predetermined dimension, quantizing the selected transformed coefficients, coding the quantized signals, the coded image signals being transmitted together with mode information indicating which dimension the selected coefficients have been transformed in, which comprises: means for decoding the coded signals; means for inversely quantizing the decoded signals; and means for inversely orthogonal-transforming the inversely quantized signals in the dimension indicated by the mode information to obtain reproduced image signals.

Further, the present invention provides an image signal decoding apparatus for decoding coded image signals obtained by orthogonal-transforming prediction error signals obtained by predictive coding in mutually different dimensions, selecting transformed coefficients of one dimension from the transformed coefficients obtained in the different dimensions according to a status of the prediction error signals, quantizing the selected transformed coefficients, coding the quantized signals, the coded image signals being transmitted together with mode information indicating which dimension the selected coefficients have been transformed in, which comprises: means for decoding the coded signals; means for inversely quantizing the decoded signals; means for inversely orthogonal-transforming the inversely quantized signals in the dimension indicated by the mode information to obtain reproduced prediction error signals; and means for reproducing the image signals by adding already-reproduced image signals to the reproduced prediction error signals, respectively.

Further, the present invention provides a method of coding image signals, comprising the steps of: orthogonal-transforming image signals to be coded in different dimensions to obtain transform coefficients for each mutually different transform dimension; detecting a status of the image signals in a predetermined dimension; selecting the transform coefficients of one of the transform dimensions on the basis of the detected result; quantizing the selected transform coefficients; and coding the quantized signals to output the coded signals.

Further, the present invention provides a method of coding image signals, comprising the steps of: forming prediction error signals by subtracting prediction signals from image signals to be coded, respectively; orthogonal-transforming the prediction error signals in mutually different dimensions to obtain transform coefficients for each different transform dimension; detecting a status of the prediction error signals in a predetermined dimension; selecting the transform coefficients of one of the dimensions on the basis of the detected result; quantizing the selected transform coefficients; and coding the quantized signals to output the coded signals.

Further, the present invention provides a method of coding image signals, comprising the steps of: orthogonal-transforming image signals to be coded in mutually different dimensions to obtain transform coefficients for each different transform dimension; quantizing the transformed coefficients for each dimension; coding the quantized signals for each dimension; comparing coded quantity of coded signals for each dimension; and selecting the coded signals of one of the transform dimensions on the basis of the compared result.

Further, the present invention provides a method of decoding coded image signals obtained by orthogonal-transforming image signals in mutually different dimensions, selecting the transformed coefficients of one dimension from the transformed coefficients obtained in the different dimensions according to status of the image signals in a predetermined dimension, quantizing the selected transformed coefficients, coding the quantized signals, the coded image signals being transmitted together with mode information indicating which dimension the selected coefficients have been transformed in, which comprises the steps of: decoding the coded signals; inversely quantizing the decoded signals; and inversely orthogonal-transforming the inversely quantized signals in the dimension indicated by the mode information to obtain reproduced image signals.

Further, the present invention provides a method of decoding coded image signals obtained by orthogonal-transforming prediction error signals obtained by predictive coding in mutually different dimensions, selecting the transformed coefficients of one dimension from the transformed coefficients obtained in the different dimensions according to status of the prediction error signals, quantizing the selected transformed coefficients, coding the quantized signals, the coded image signals being transmitted together with mode information indicating which dimension the selected coefficients have been transformed in, which comprises the steps of: decoding coded signals; inversely quantizing the decoded signals; inversely orthogonal-transforming the inversely quantized signals in the dimension indicated by the mode information to obtain reproduced prediction error signals; and reproducing the image signals by adding already-reproduced image signals to the reproduced prediction error signals, respectively.

DETAILED DESCRIPTION OF THE PREFERRED EMBODIMENTS

The embodiments of the coding apparatus and decoding apparatus according to the present invention will be described hereinbelow with reference to the attached drawings.

Figures 2A, 2B, 4:
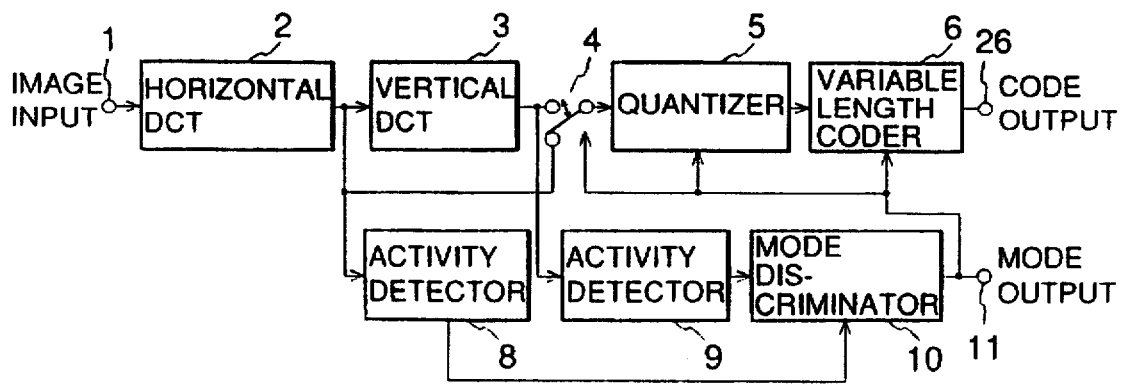
FIG. 2A is a table showing the transform (scanning) sequence of two-dimensional arranged signals.
FIG. 2B is a table showing the transform (scanning) sequence of one-dimensional arranged signals.
FIG. 4 is a block diagram showing a first embodiment of the orthogonal transform coding apparatus according to the present invention.

FIG. 4 shows a first embodiment of the orthogonal coding apparatus. The apparatus comprises an image signal input 1, a horizontal DCT (discrete cosine transformer) 2, a vertical DCT 3, a selector 4, a quantizer 5, a variable length coder 6, a coded signal output 7, and in addition a first activity detector 8, a second activity detector 9, a mode discriminator 10, and a mode output 11.

Image signals inputted through the image input 1 are DCTed (discrete cosine transformed) in the horizontal direction for each block of 8×8 pixels by the horizontal DCT 2, and then the horizontal DCTed signals are given to the vertical DCT 3, the selector 4, and the first activity detector 8, respectively. The horizontal DCTed signals are further DCTed in the vertical direction by the vertical DCT 3, and then the two-dimensional DCTed signals are given to the selector 4, and the second activity detector 9.

Here, when the image signals are DCTed only in the horizontal direction by the horizontal DCT 2, the DCT block is of one-dimension (horizontal direction) of 8 pixels. However, it is convenient to bundle 8 DCT blocks in the vertical direction into a block of 8×8 pixels under consideration of switching from one-dimensional processing to the two-dimensional processing or vice versa.

Figure 5A:
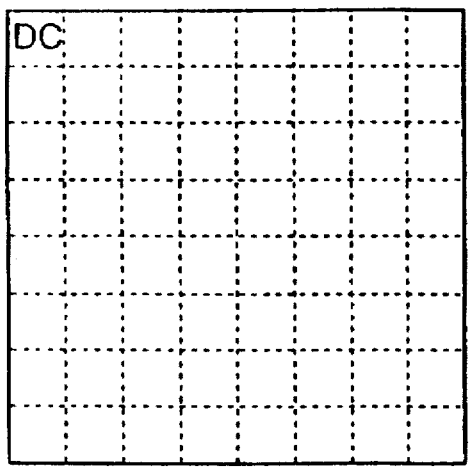
FIG. 5A is a table showing the construction of a two-dimensional DCTed (discrete cosine transformed) block.
Figure 5B:
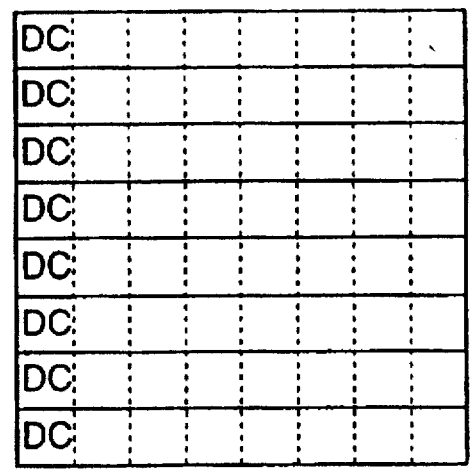
FIG. 5B is a table showing the construction of a one-dimensional DCTed (discrete cosine transformed) block.

FIG. 5A shows a two-dimensional DCT block; and FIG. 5B shows a horizontal DCT block. In FIGS. 5A and 5B, DCs represent average components of the DCT coefficients of the DCTed signals, and blanks represent alternating components (AC), respectively.

The first activity detector 8 detects the activity of the signals DCTed only in the horizontal direction. The activity A1d of the signals can be obtained by an addition of absolute values of the respective DCT coefficients, for instance as expressed by formula (1) below:

$$A1d = \sum_{x=1}^{7} \sum_{y=0}^{7} |C1d_{xy}| + \sum_{y=1}^{7} |C1d_{oy} - C1d_{o(y-1)}| \quad (1)$$

where $C1d_{xy}$ denotes a coefficient value of the x-th DCT position in the horizontal direction and the y-th DCT position in the vertical direction; and $C1d_{oy}$ denotes a DC component.

Further, although there exist 8 DC components within a block of 8×8 pixels, the simple sum of these DC absolute values is not suitable for the activity. Therefore, differences between adjacent two DC components in the vertical direction are calculated as the formula (1) above. Further, in the formula (1), the first one DC value (at which no difference can be obtained) is excluded from the above-mentioned addition.

The second activity detector 9 detects the activity of the signals two-dimensional DCTed both in the horizontal and vertical directions. The activity A2d of the signals can be obtained by an addition of absolute values of the respective coefficients, for instance as expressed by formula (2) below:

$$A2d = \sum_{x=0}^{7} \sum_{y=0}^{7} |C2d_{xy}| - C2d_{00} \quad (2)$$

where $C2d_{xy}$ denotes a coefficient value of the x-th two-dimensional DCT position in the horizontal direction and the y-th two-dimensional DCT position in the vertical direction; and $C2d_{00}$ denotes a DC component. Further, in the formula (2), the one DC component is excluded.

Further, in the case where the coded signals are not the image signals but the error signals of the interframe prediction, since the DC component is substantially regarded as the AC component, the absolute values of all the coefficients are simply added. In practice, the following formula (3) is used in place of the formula (1) in the first activity detector 8, and the following formula (4) is used in place of the formula (2) in the second activity detector 9.

$$A1d = \sum_{x=0}^{7} \sum_{y=0}^{7} |C1d_{xy}| \quad (3)$$

$$A2d = \sum_{x=0}^{7} \sum_{y=0}^{7} |C2d_{xy}| \quad (4)$$

Here, the unit of pixels switched for processing is not necessarily the same as the number of pixels of the DCT block (8×8 pixels); that is, it is possible to bundle a plurality of the DCT blocks. In the case where the color difference signals of color images are sub-sampled, in particular, since a plurality of luminance signal blocks and the color difference signal block are paired, the bundled blocks are sometimes convenient.

The horizontal DCT activity obtained by the first activity detector 8 and the two-dimensional DCT activity obtained by the second activity detector 9 are given block by block to the mode discriminator 10.

The mode discriminator 10 compares the two activities to determine which one of the activities is smaller than the other; that is, to obtain mode information. In this comparison, it is possible to add a value (about 1 for each coefficient) to one of the activities (as far as the inputted image signals are of 8 bits and represented by values from 0 to 255 and further the transform magnification of the horizontal DCT 2 and the vertical DCT 3 is $8^{1/2}$ respectively) or to multiply one of the activities by about 1.25, so that a certain offset can be given for adjustment of the selection.

The mode information thus obtained is outputted to a decoding apparatus described later through the mode output 11 and further to the selector 4, the quantizer 5 and the variable length coder 6. On the basis of the mode information, the selector 4 selects transform (DCT) coefficients and the selected transform coefficients are given to the quantizer 5.

When the respective DCT coefficients are quantized uniformly, the quantizer 5 executes the same processing. When the DCT coefficients are weighted in accordance with the visual characteristics, the quantizer 5 executes different processing according to the transform method. The weighted quantization of the DCT coefficients is executed on the basis of the mode information so as to obtain the two-dimensional characteristics in the case of the two-dimensional (in both horizontal and vertical directions) DCT and so as to obtain the one-dimensional characteristics in the case of the one-dimensional (in only the horizontal direction) DCT.

The output of the quantizer 5 is coded by the variable length coder 6. The sequence of arrangement transform (scanning) executed by the variable length coding is different between the two-dimensional DCT and the one-dimensional DCT. The scanning sequence of the two-dimensional DCT is the same as with the case of the prior art as shown in FIG. 2A. However, the scanning sequence of the one-dimensional DCT becomes as shown in FIG. 2B. By processing 8 one-dimensional DCTed signals bundled as shown in FIG. 2B, it is possible to improve the efficiency of the 0-run length coding with the use of the same VLC (variable length coding) table. The codes compressed by the variable length coder 6 are outputted to a decoding apparatus (described later) through the code output 7.

In the first embodiment of the coding apparatus according to the present invention as describe above, the activity of the signals DCTed only in the horizontal direction is obtained by the first activity detector 8, and further the activity of the signal two-dimensional DCTed in both horizontal and vertical directions is obtained by the second activity detector 9. In other words, the activities of the DCTed signals are calculated on the basis of transform coefficients obtained by a plurality of orthogonal transforming means (the horizontal DCT 2 and the vertical DCT 3), and the appropriate orthogonal transforming method of the signals to be coded can be discriminated or selected. Accordingly, the coding apparatus is simple in configuration and high in processing speed. Further, the apparatus is high in precision, as compared with the case where the activity is obtained by the use of the final data coded. This is because in the case of the present embodiment, the transform coefficients obtained by the horizontal DCT 2 and the vertical DCT 3 directly indicate the activity required to select the orthogonal transform method.

Figure 6:
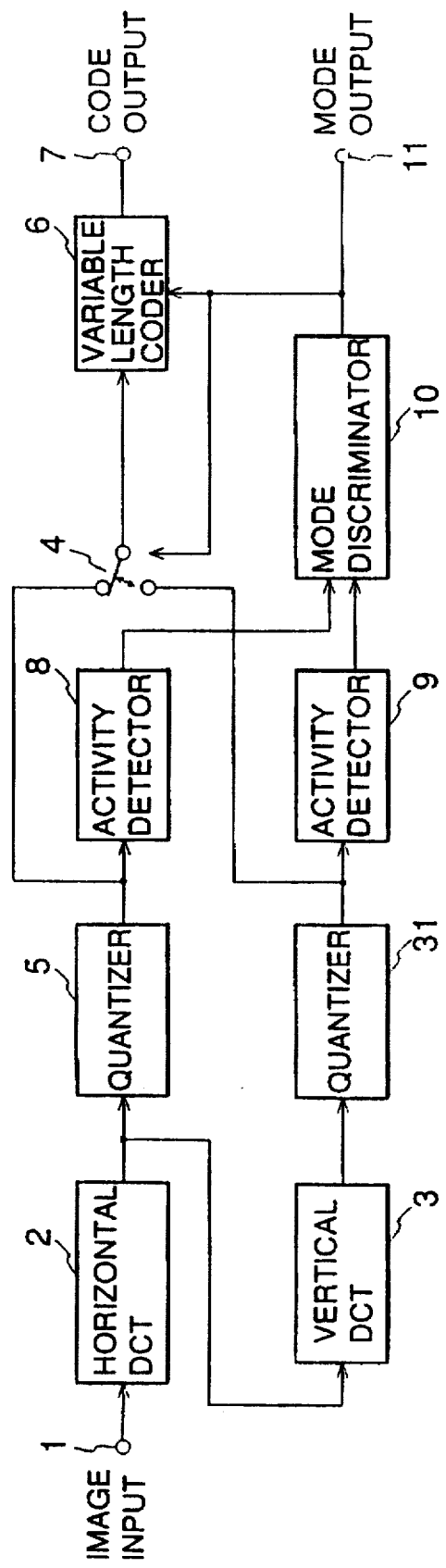
FIG. 6 is a block diagram showing a second embodiment of the orthogonal transform coding apparatus according to the present invention.

FIG. 6 shows a second embodiment of the orthogonal transform coding apparatus according to the present invention, in which the same reference numerals have been retained for the similar parts or elements which have the same functions as with the case of the first embodiment shown in FIG. 4.

In FIG. 6 the image signals inputted through the image input 1 are DCTed in the horizontal direction by the horizontal DCT 2, and then given to the vertical DCT 3 and the quantizer 5. The image signals DCTed in the horizontal direction by the horizontal DCT 2 are further DCTed in the vertical direction by the vertical DCT 3 as the two-dimensional DCTed signals, and then given to another quantizer 31. The horizontally DCTed image signals are quantized by the quantizer 5. In this case, the weighting according to the one-dimensional (horizontal) visual characteristics is made to the respective DCT signals or coefficients by the quantizer 5. The quantized coefficients are given to the activity detector 8 and the selector 4, respectively. In the same way, the horizontally and vertically DCTed image signals are quantized by the quantizer 31. In this case, the weighting according to the two-dimensional (horizontal and vertical) visual characteristics is made to the respective DCT signals or coefficients by the quantizer 31. The quantized coefficients are given to the activity detector 9 and the selector 4, respectively.

In FIG. 6, the functions of the activity detector 8 and the activity detector 9 are the same as with the case of the first embodiment as shown in FIG. 4. However, the DCTed image signals are weighted and then quantized in such a way that the weighting decreases as the image signal components increase in frequency. Since the weighting of the quantization is effected as described above, it is possible to allow the coding to be more suitable for the practical coding method. The activity of the horizontal DCTed signals obtained by the activity detector 8 and the activity of the two-dimensional DCTed signals obtained by the activity detector 9 are both given to the mode discriminator 10 for each block.

The mode discriminator 10 compares the two activities to select the smaller one, and outputs the orthogonal transform mode information. The outputted mode information is given to the variable length coder 6 and further to a decoding apparatus (described later) through the mode output 11.

The selector 4 selects one of the outputs of the quantizer 5 and the quantizer 31 on the basis of the mode information, and the selected quantized coefficients are given to the variable length coder 6. The variable length coder 6 codes the quantized coefficients by changing the scanning sequence (as shown in FIGS. 2A and 2B) on the basis of the mode information. The coded data compressed by the variable length coder 6 are outputted to the decoding apparatus through the code output 7.

Figure 7:
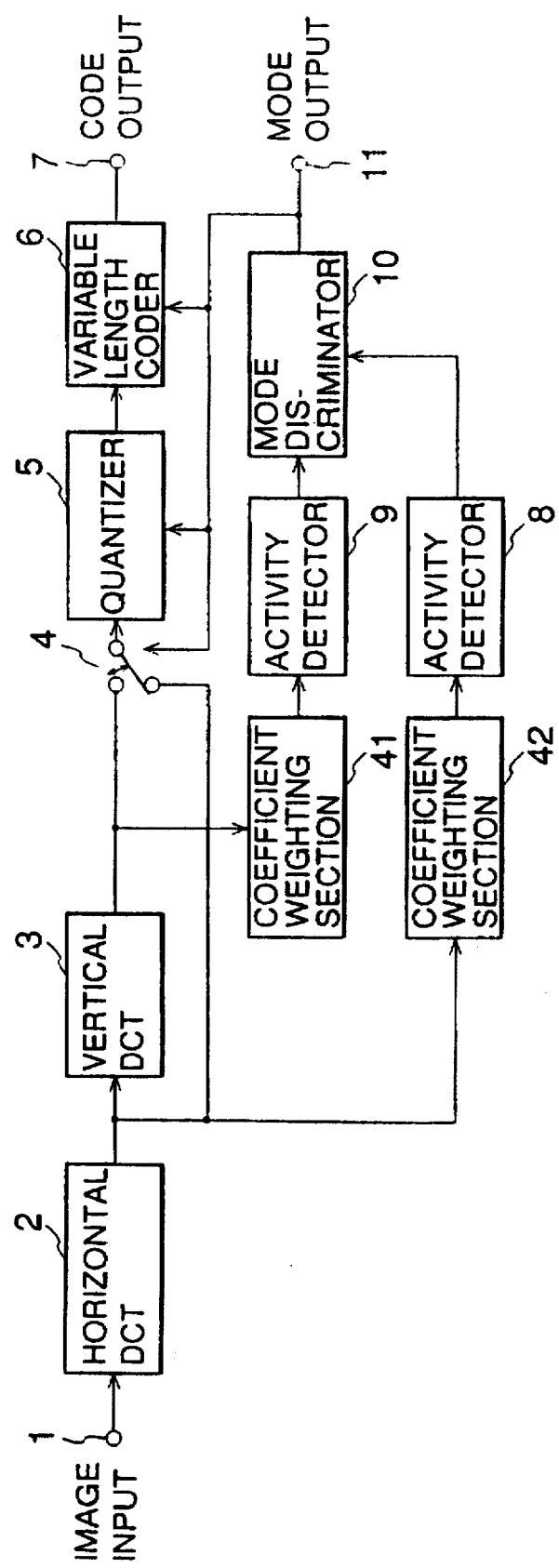
FIG. 7 is a block diagram showing a third embodiment of the orthogonal transform coding apparatus according to the present invention.

FIG. 7 shows a third embodiment of the orthogonal transform coding apparatus according to the present invention, in which the same reference numerals have been retained for the similar parts or elements which have the same functions as with the case of the first embodiment shown in FIG. 4. The basic operation of this third embodiment is the same as the case of the first embodiment shown, except the method of weighting the coefficients when the activities are obtained.

In FIG. 7, the horizontal DCT 2 and the vertical DCT 3 operate in the same way as those shown in FIG. 4. The output of the horizontal DCT 2 is given to the vertical DCT 3 and a coefficient weighting section 42, and the output of the vertical DCT 3 is given to a coefficient weighing section 41.

The coefficient weighting section 41 divides each coefficient by a value corresponding to the weight determined when the two-dimensional DCTed signals are quantized. In the same way, the coefficient weighting section 42 divides each coefficient by a value corresponding to the weight determined when the horizontally DCTed signals are quantized. That is, the processing is equivalent to that by which the DCTed signals are quantized on the basis of sufficiently small quantization step. The divided coefficient output of the coefficient weighting section 41 is given to the activity detector 9, and the divided coefficient output of the coefficient weighting section 42 is given to the activity detector 8, respectively.

In comparison with the second embodiment shown in FIG. 6, in this third embodiment, it is possible to apply a weight even a small coefficient value so as to be used for the mode discrimination, otherwise it will be neglected.

The functions of the activity detectors 8 and 9, the mode discriminator 10, the selector 4, the quantizer 5, and the variable length coder 6 are all the same as with the case of the first embodiment shown in FIG. 4. The compressed coded data are outputted to the decoding apparatus through the code output 7.

Figure 1:
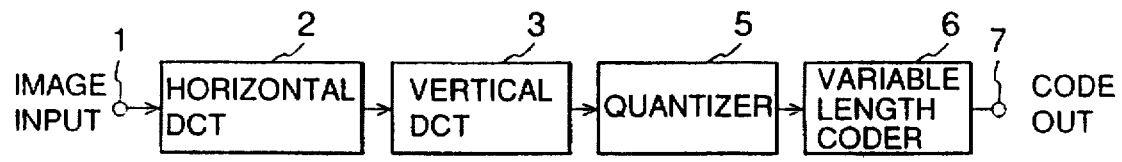
FIG. 1 is a block diagram showing a prior art orthogonal transform coding apparatus.
Figure 3:
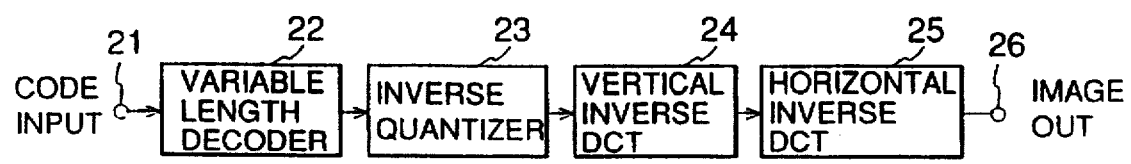
FIG. 3 is a block diagram showing a prior art orthogonal transform decoding apparatus.
Figure 8:
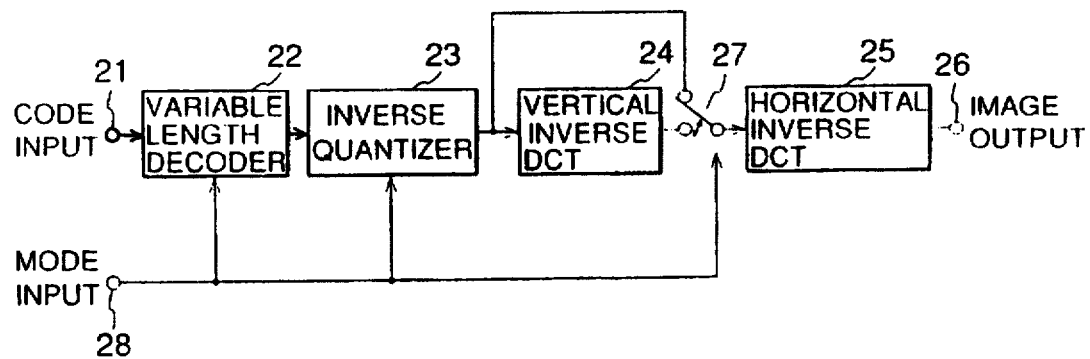
FIG. 8 is a block diagram showing a first embodiment of the orthogonal transform decoding apparatus according to the present invention.

FIG. 8 shows a first embodiment of the orthogonal transform decoding apparatus according to the present invention, in which the same reference numerals have been retained for the similar parts or selections which have the same functions as with the case of the prior art decoding apparatus as shown in FIG. 3. In FIG. 8, the decoding apparatus comprises a mode input 28 and a selector 27 in addition to the elements shown in FIG. 3. The compressed data applied through the code input 21 are introduced into the variable length decoder 22. On the other hand, the mode information obtained by the coding apparatus according to the present invention is inputted through the mode input 28, and then given to the variable length decoder 22, the inverse quantizer 23, and the selector 27, respectively.

The functions of the variable length decoder 22 and the inverse quantizer 23 are basically the same as those of the prior art decoding apparatus shown in FIG. 3. However, in the variable length decoder 22, the scanning order is switched on the basis of the mode information. Further, in the inverse quantizer 23, the weighting of the coefficient is switched on the basis of the mode information. The output of the inverse quantizer 23 is given to the vertical inverse DCT 24 and the selector 27. The vertical inverse DCT 24 inversely transforms the DCTed signals in the vertical direction. The selector 27 controlled on the basis of the mode information selects the output of the vertical inverse DCT 24 in the case of the two-dimensional DCTed block and output of the inverse quantizer 24 in the case of the horizontal DCTed block. The selected DCTed block is introduced to the horizontal inverse DCT 25 to inversely transform the DCTed signals in the horizontal direction.

As described above, the two-dimensional block is inversely DCTed in both vertical and horizontal directions, and the one-dimensional (horizontal) block is inversely DCTed in only the horizontal direction. The reproduced image signals thus obtained are outputted through the image output 26.

In the orthogonal coding apparatus according to the present invention as shown in FIGS. 4, 8 and 7, since the dimension of the orthogonal transform is controllably changed for each block to select an optimum transform method, it is possible to execute the optimum coding processing for each block (for each image position) and thereby to improve the coding efficiency all over the image, as compared with the apparatus which adopts only a single transform method. Further, since the one-dimensional transform is executed at image edges, for instance, it is possible to reduce the quantization noise and error, thus improving the image quality. In addition, the transform method is determined or selected on the basis of the activities derived from the orthogonal transformed coefficients or the transformed and quantized coefficients, the activities can be detected easily at high precision.

Figure 9:
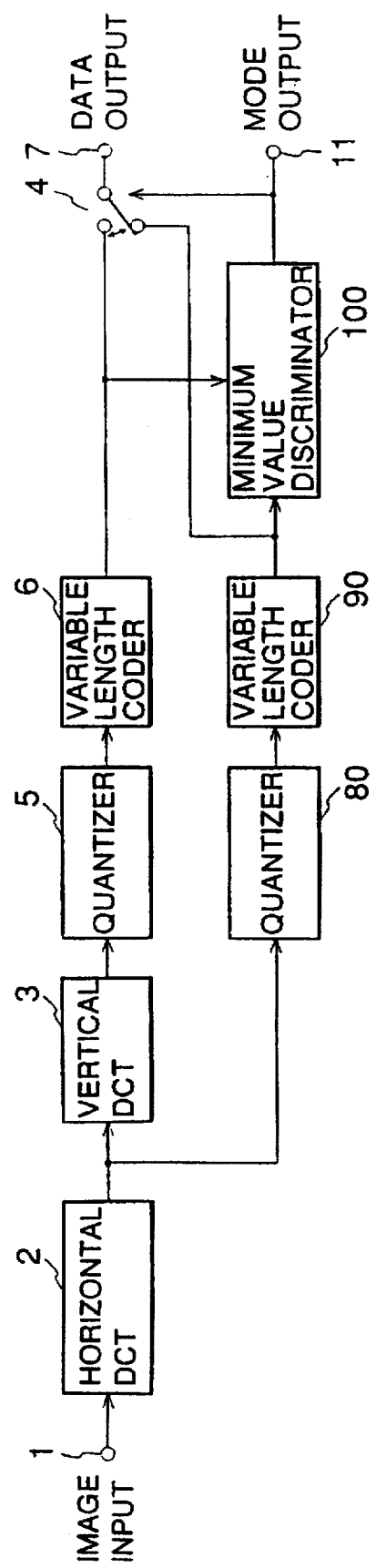
FIG. 9 is a block diagram showing a fourth embodiment of the orthogonal transform coding apparatus according to the present invention.

FIG. 9 shows a fourth embodiment of the orthogonal transform coding apparatus according to the present invention, in which the same reference numerals have been retained in the same way as in the previous embodiments.

In FIG. 9, the image signals given through the image input 1 are DCTed for each block of 8×8 pixels in the horizontal direction by the horizontal DCT 2, and then given to the vertical DCT 3 and the quantizer 80. The horizontally DCTed signals are further DCTed in the vertical direction by the vertical DCT 3, and then given to the quantizer 5 as the two dimensional DCTed signals. In other words, the quantizer 80 quantizes the signals DCTed only in the horizontal direction, and the quantizer 5 quantizes the signals DCTed both in the horizontal and vertical directions.

Here, in the case of the horizontal transform, the DCT block is of 8 pixels of one dimension. However, as well as in the case of the horizontal and vertical (two-dimensional) transform, the DCT block is of 8×8 pixels of two dimension (8 horizontal blocks are bundled in the vertical direction as shown in FIG. 5B) for convenience of switching between one dimensional processing and two dimensional processing.

When the two quantizers 5 and 80 quantize the respective coefficients of the DCTed signals uniformly, the quantization processing becomes the same for both. However, when the weighting is made to the respective DCT coefficients according to the visual characteristics (e.g., rough at higher frequencies), the quantization processing is different form each other. The quantizer 5 effects the quantization weighting in accordance with the two-dimensional characteristics; however, the quantizer 80 effects the quantization weighting repeatedly in accordance with the one-dimensional characteristics.

The output of the quantizer 5 is coded by the variable length coder 6, and the output of the quantizer 80 is coded by the variable length coder 90, respectively. Both the coded signals are given to the selector 4 and a minimum value discriminator 100. The way of arrangement transform (scanning sequence) of the variable length coding is different between the quantizers 6 and 90. In more detail, the arrangement transform in the variable length coder 6 is of oblique zigzag scanning as shown in FIG. 2A in the same way as in the conventional way, and the arrangement transform in the variable length coder 90 is of vertical scanning as shown in FIG. 2B. This arrangement transform method is the same as disclosed in the prior application of a co-inventor and the same Applicant (Japanese Patent Application No. 1-213939).

As described above, since the one-dimensional DCTed signals are processed for each block of 8×8 pixels by bundling the 8 pixels of one dimension so as to be processed in the same way as with the case of the two-dimensional DCTed signals, it is possible to improve the efficiency of the 0-run length coding. Further, in this case, the same VLC (variable length coding) table can be used for both the quantizers 6 and 10. However, when two different VLC tables are used for the two quantizers appropriately, it is possible to further improve the coding efficiency.

The minimum value discriminator 100 compares the outputs of (i.e., the code quantities (the numbers of bits) of the respective blocks) of the two variable length coders 6 and 90, and outputs a control signal as the mode information so that the output of the smaller number of bits can be selected.

Here, the unit of pixels compared with respect to the numbers of bits to switch the processing is not necessarily the same as the number of pixels of the DCT block (8×8 pixels); that is, it is possible to bundle any number of the DCT blocks. In the case where the color difference signals of color images are sub-sampled in particular, since a plurality of luminance signal blocks and one color difference signal block are paired according to the proportion of the sub-sampling, it is convenient to compare the numbers of bits for each pair to switch the processing.

The mode information is outputted to the selector 4 and further to the decoding apparatus (described later) through the mode output 11. The selector 4 selects one (smaller in data quantity) of the outputs of the variable length coders 8 and 90 and outputs the selected data through the data (code) output 7. Therefore, in the case where the correlation is small in the vertical direction, since the one-dimensional (horizontal) DCTed signals are selected without DCTing the image signals in the two-dimensional, it is possible to execute orthogonal transform coding high at efficiency and low in noise.

In the above-mentioned processing, when the quantization weighting is determined in such a way that the distortion caused by the quantization becomes the same in the respective transform processing and further one (smaller in data quantity) of the outputs of the variable length coders 6 and 90 can be selected under these conditions, it is possible to equalize the distortion degree and further to reduce the overall data quantity. In this case, when the quantization of the quantizer 80 is determined to be slightly rough, although the one-dimensional transformed signals are apt to be selected and thereby the coding error increases slightly, it is possible to obtain a coding desirable from the visual standpoint.

Figure 10:
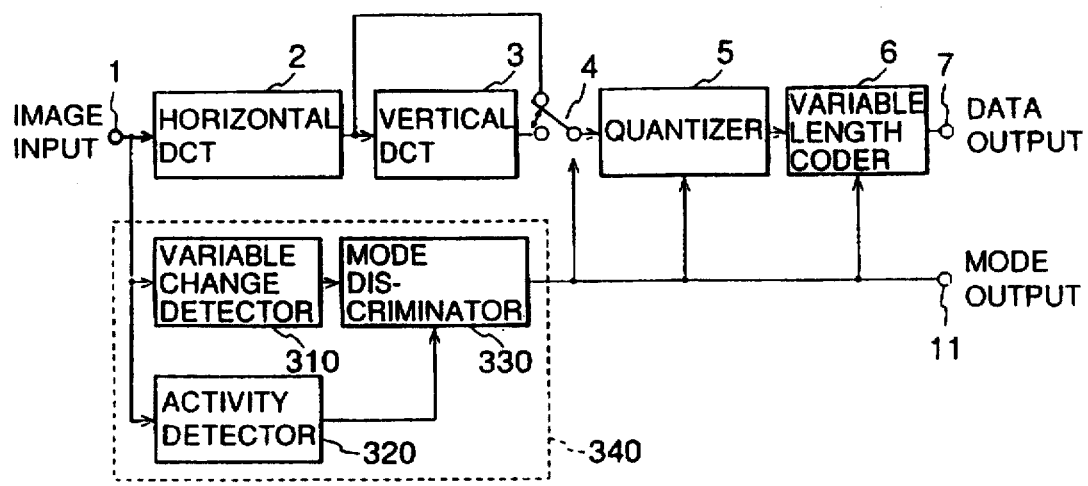
FIG. 10 is a block diagram showing a fifth embodiment of the orthogonal transform coding apparatus according to the present invention.

FIG. 10 shows a fifth embodiment of the orthogonal transform coding apparatus according to the present invention, in which the transform mode is determined by means different from the main coding system of the fourth embodiment shown in FIG. 9.

In FIG. 10, the image signals given through the image input 1 are DCTed in the horizontal direction as block signals of 8×8 pixels by the horizontal DCT 2, and then introduced to the vertical DCT 3 and the selector 4. The horizontally DCTed signals are further DCTed in the vertical direction, and then the two-dimensional DCTed signals are given to the selector 4.

On the other hand, a mode discriminating section 340 includes a vertical change detector 310, an activity detector 320 and a mode discriminator 330. The image signals inputted through the image input 1 are given to the vertical change detector 310 for detecting the change rate v in the vertical direction, and the activity detector 320 for detecting the dispersion value d in the image block. The change rate v in the vertical direction and the dispersion value d of the block are expressed by the formulae as follows:

$$v = \sum_{x=0}^{7} \sum_{y=0}^{6} (P_{xy} - P_{x(y-1)})^2 \quad (5)$$

$$dc = \frac{1}{64} \sum_{x=0}^{7} \sum_{y=0}^{7} P_{xy} \quad (6)$$

-continued
$$d = \sum_{x=0}^{7} \sum_{y=0}^{7} (P_{xy} - dc)^2 \quad (7)$$

where dc denotes an average value, and $P_{xy}$ denotes a horizontal x-th and vertical y-th pixel value in the 8×8 block.

The mode discriminator 330 compares the two information values. When the change rate v in the vertical direction is relatively large with respect to the dispersion value d, the mode discriminator 330 outputs a control signal to select only the horizontal DCTed signals. This is because when the signals (whose change rate v in the vertical direction is large) is DCTed in the vertical direction, the components of higher frequencies increase and therefore the transform efficiency is deteriorated as compared with when not DCTed. In other words, when the mode discriminating section 340 discriminates that the change rate v of the two dimensional DCTed signals are relatively large, the orthogonal transform is not executed in the two-dimension to prevent the transform efficiency from being reduced.

The functions of the quantizer 5 and the variable length coder 6 are the same as with the case of the first embodiment shown in FIG. 4.

In this fifth embodiment, since only one main coding system is used, it is possible to reduce the processing quantity as compared with the fourth embodiment shown in FIG. 9.

Figure 11:
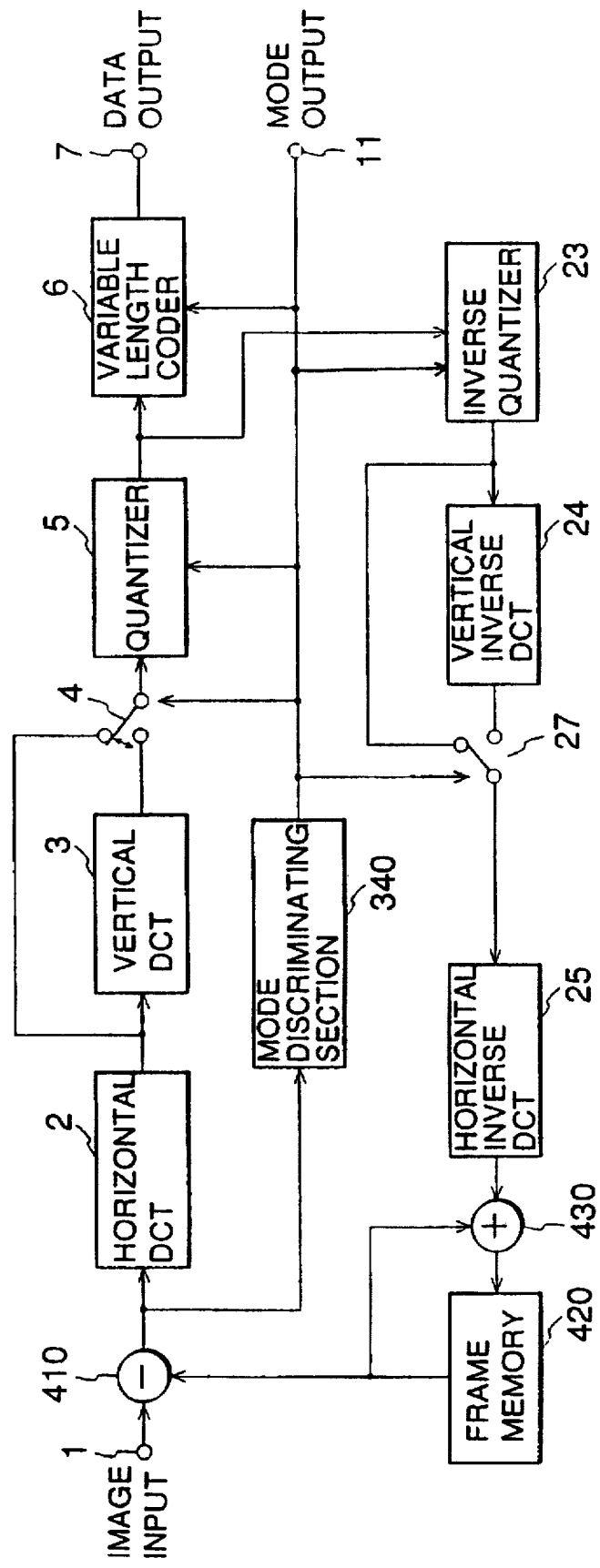
FIG. 11 is a block diagram showing a sixth embodiment of the orthogonal transform coding apparatus according to the present invention.

FIG. 11 shows a sixth embodiment of the orthogonal transform coding apparatus according to the present invention, in which the same reference numerals have been retained in the same way as in the other embodiments. In this embodiment, interframe prediction is effected, and the orthogonal transform is effected for the prediction error signals.

The image signals inputted through the image input 1 are given to a prediction subtracter 410. The prediction signals given by a frame memory 420 are subtracted from the image signals to obtain the prediction error signals. The prediction error signals are given to the horizontal DCT 2 and the mode discrimination section 340.

The functions of the mode discrimination section 340, the horizontal DCT 2, the vertical DCT 3, the selector 4, the quantizer 5, and the variable length coder 6 are the same as with the case of the fifth embodiment shown in FIG. 10. Further, the functions of a local decoding section composed of the inverse quantizer 23, the horizontal inverse DCT 25, the vertical inverse DCT 24 and the selector 27 are the same as with the case of the first embodiment of the decoding apparatus shown in FIG. 8.

The prediction signals given by the frame memory 420 are added to the prediction error signals (locally decoded by the horizontal inverse DCT 25) by an adder 430 to obtain the reproduced image signals. The obtained image signals are given to the frame memory 420. The reproduced image signals delayed by one frame are applied as the prediction signals from the frame memory 420 to the prediction subtracter 410 and the adder 430.

The prediction error signals are lower in correlation than the ordinary image signals. Therefore, the proportion at which the one-dimensional DCTed signals are used is more increased than the ordinary image signals. In other words, when the image moves slightly, since the prediction error is small and the intraframe correlation is small, the image signals are orthogonal-transformed by the one-dimensional DCT without use of the two-dimensional DCT, thus increasing the transform efficiency and decreasing the transform noise.

Further, in the practical apparatus, motion compensation is usually applied to the interframe prediction signals.

However, the embodiment of the present invention including no motion compensation function is substantially the same as the practical apparatus including the motion compensation function.

Figure 12:
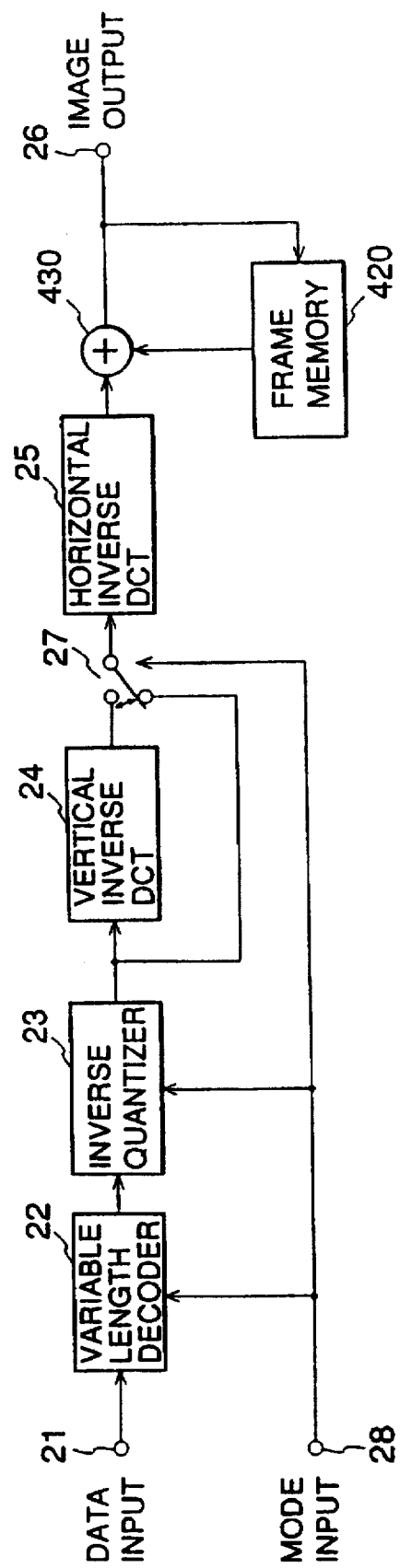
FIG. 12 is a block diagram showing a second embodiment of the orthogonal transform decoding apparatus according to the present invention.

FIG. 12 shows a second embodiment of the orthogonal transform decoding apparatus according to the present invention, in which the same reference numerals have been retained for the similar parts or sections which have the same functions as with the case of the first embodiment shown in FIG. 8. This decoding apparatus corresponds with the coding apparatus shown in FIG. 11. The functions of the variable length decoder 22, the inverse quantizer 22, the vertical inverse DCT 24, the horizontal inverse DCT 25, and the selector 27 are the same as with the case of the decoding apparatus shown in FIG. 8, and the functions of the frame memory 420 and the adder 430 are the same as with the case of the coding apparatus shown in FIG. 11.

In the above-mentioned orthogonal transform coding apparatuses, since the dimension of the orthogonal transform is changed block by block to select the optimum transform method, it is possible to code the image signals for each block locally under the optimum conditions and thus to improve the coding efficiency all over the image, as compared with the coding method using only a fixed transform method. When the concept of the present invention is applied to the interframe prediction error signals in particular, since the interframe correlation of the prediction error is small, it is possible to execute the orthogonal transform coding at an extremely high efficiency. Further, since the one-dimensional orthogonal transform coding is adopted at the image edge portions, the noise caused by the quantization can be reduced, so that the image quality can be further improved by reducing the coding error.

Figure 13A:
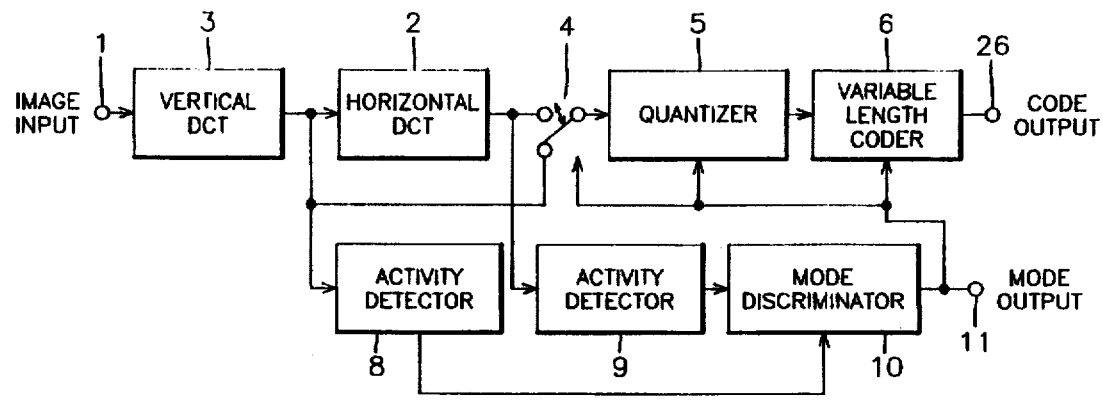
FIG. 13A is a block diagram of an orthogonal transform coding apparatus identical to that illustrated in FIG. 4 except that the horizontal DCT and vertical DCT are interchanged.
Figure 13B:
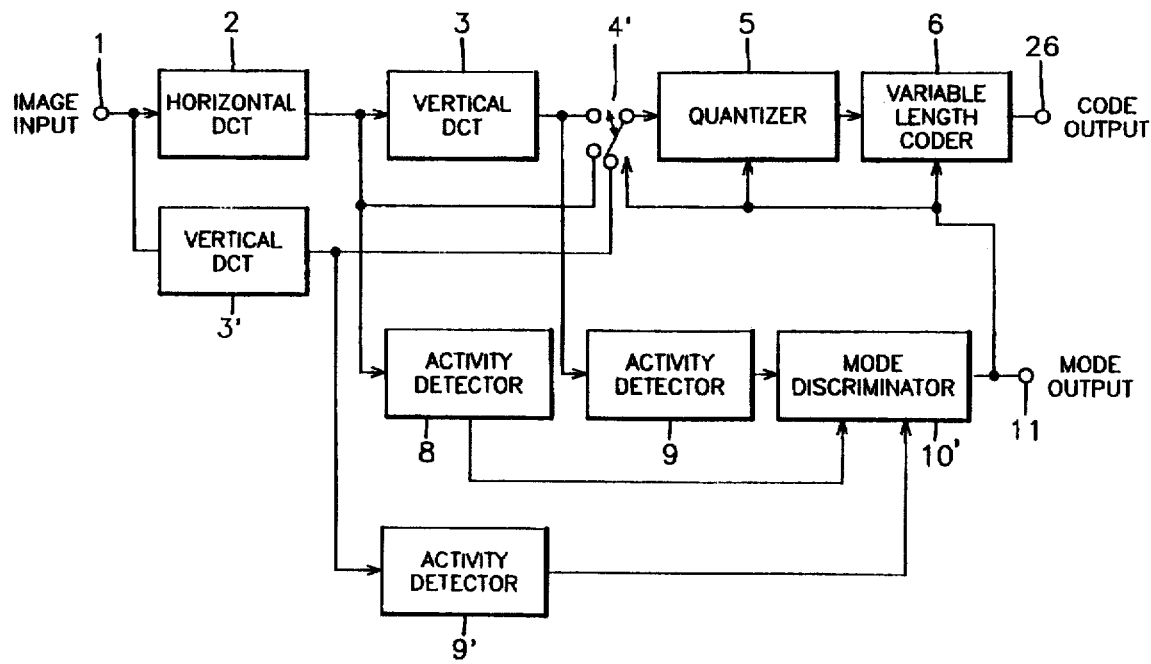
FIG. 13B is a block diagram of an orthogonal transform coding apparatus similar to that illustrated in FIG. 4, and further comprising an additional vertical DCT and activity detector.

Further, in the above-mentioned embodiments, although two-dimensional and horizontal orthogonal transform coding and decoding apparatuses have been explained by way of example, it is possible to apply the present invention as illustrated in FIGS. 13A and 13B, to various orthogonal transform coding and decoding apparatuses such as the two-dimensional and vertical transform coding apparatus, vertical and horizontal transform coding apparatus, two-dimensional and vertical and horizontal one-dimensional transform coding apparatus, and further the coding apparatus having mode excluding the orthogonal transform coding.

What is claimed is:

1. An image signal decoding apparatus for decoding coded image signals obtained by orthogonal-transforming image signals in one dimension and two dimensions, respectively, selecting transformed coefficients obtained in the one dimension or two dimensions according to a detected status of the image signals on the basis of the one dimension and two dimension transformed coefficients, quantizing the selected transformed coefficients, coding the quantized signals, the coded image signals being transmitted together with mode information indicating which dimension the selected transformed coefficients have been transformed in on the basis of the detected status, which comprises:

means for decoding the coded image signals by a decoding order on the basis of the mode information;

means for inversely quantizing the decoded signals with weighing of the transformed coefficients of the decoded signals on the basis of the mode information;

and means for inversely orthogonal-transforming the inversely quantized signals in the dimension indicated by the mode information to obtain reproduced image signals.

2. A method of decoding coded image signals obtained by orthogonal-transforming image signals in one dimension and two dimensions, respectively, selecting the transformed coefficients obtained in the one dimension or two dimensions according to a detected status of the image signals on the basis of the one dimension and two dimension transformed coefficients, quantizing the selected transformed coefficients, coding the quantized signals, the coded image signals being transmitted together with mode information indicating which dimension the selected transformed coefficients have been transformed in on the basis of the detected status, which comprises the steps of:

decoding the coded image signals by a decoding order on the basis of the mode information;

inversely quantizing the decoded signals with weighing of the transformed coefficients of the decoded signals on the basis of the mode information; and inversely orthogonal-transforming the inversely quantized signals in the dimension indicated by the mode information to obtain reproduced image signals.

3. An image signal coding apparatus comprising:

means for orthogonal-transforming image signals to be coded by two-dimensional transformation and vertical one-dimensional transformation to obtain first transform coefficients and second transform coefficients, respectively;

means for detecting a status of the image signals on the basis of the first and second transform coefficients to output a status signal;

means responsive to the status signal for selecting between the first and the second transform coefficients to provide selected transform coefficients;

means for quantizing the selected transform coefficients to produce quantized transform coefficients; and means for coding the quantized transform coefficients to output coded signals.

4. The image signal coding apparatus of claim 3, wherein said detecting means comprises means for detecting a first activity and a second activity of the first and second transform coefficients, respectively, and means for comparing the first and second activities mutually.

5. A method of coding image signals, comprising the steps of:

orthogonally-transforming said image signals to be coded by two-dimensional transformation and vertical one-dimensional transformation to obtain first transform coefficients and second transform coefficients, respectively;

detecting a status of the image signals on the basis of the first and second transform coefficients to output a status signal;

selecting between the first and the second transform coefficients in response to the status signal to provide selected transform coefficients;

quantizing the selected transform coefficients to produce quantized transform coefficients; and coding the quantized transform coefficients to output coded signals.

* * * * *